United States Patent [19]

Taoda et al.

[11] Patent Number: 4,869,795

[45] Date of Patent: Sep. 26, 1989

[54] METHOD FOR GASIFICATION OF AQUEOUS ACETONE SOLUTION

[75] Inventors: Hiroshi Taoda, Nagoya; Kiyoshi Hayakawa, Gifu; Masato Tazawa, Nagoya; Hiromi Yamakita, Owari-Asahi, all of Japan

[73] Assignees: Agency of Industrial Science, Tokyo, Japan; Ministry of International Trade and Industry, Tokyo, Japan

[21] Appl. No.: 319,725

[22] Filed: Mar. 7, 1989

[30] Foreign Application Priority Data

Jun. 13, 1988 [JP] Japan ............................. 63-144988

[51] Int. Cl.$^4$ ............................................. B01J 19/08
[52] U.S. Cl. ........................... 204/157.15; 204/157.52; 204/157.6
[58] Field of Search .................. 204/157.15, 157.52, 204/157.6

[56] References Cited

PUBLICATIONS

5th Int. Conf. Photochem. Conversion and Storage of Solar Energy, Osaka (1984).

Photocatalytic Dehyrtogenation of 2-propanol with Sn (II)-Coordinated Ru and Ir Complexes in the . . . . Yamakawa, et al.

*Primary Examiner*—John F. Niebling
*Assistant Examiner*—Ben C. Hsing
*Attorney, Agent, or Firm*—Oblon, Spivak, McClelland, Maier & Neustadt

[57] ABSTRACT

A fuel gas is produced from an aqueous acetone solution by causing the aqueous acetone solution to contact powdered silicon and exposing the resultant product of this contact to light.

6 Claims, No Drawings

METHOD FOR GASIFICATION OF AQUEOUS ACETONE SOLUTION

BACKGROUND OF THE INVENTION

1. Field of the Invention

This invention relates to a technique for the utilization of light radiation energy such as solar energy. More particularly, this invention relates to a method for converting an aqueous solution into a gaseous fuel by the use of solar energy and the thermal energy thereof.

2. Prior Art Statement

The oil crisis in 1973 gave a powerful impetus to the development of solar energy and other forms of energy to take the place of oil and the research on energy saving techniques such as the utilization of waste heat. Various research has since been continued for effective utilization of light radiation energy such as solar energy. Among various methods for the utilization of radiation energy is a method which comprises converting a radiation energy such as solar energy into a chemical energy through the agency of a chemical reaction and storing the chemical energy for future use. This method enjoys various great advantages such as (1) the fact that the energy stored in the form of chemical energy does not decrease spontaneously during the storage, (2) the fact that the energy can be used whenever it is needed, and (3) the fact that the stored energy can be used in the form of heat at a higher temperature than that of the original heat source. As one of the reactions available for this method, the liquid-phase dehydrogenation reaction of 2-propanol has been known to the art. This reaction comprises mixing 2-propanol with a catalyst such as a metal complex and heating and exposing the resultant mixture to light and, consequently, produces acetone with evolution of hydrogen gas. The catalysts heretofore proposed for use in this reaction include Raney nickel [Shiro Kudo: "Lecture on Catalyst Engineering, Vol. 7," (1964) Chijin Shokan, p. 209], a $RhCl_3$-$SnCl_2$-LiCl type complex [H. B. Charman: J. Chem. Soc., Ser. B. 584 (1970)], $Ru(CO)(OCOCF_3)_2(PPh_3)_2$ [A. Dobson et al: "Inorg. Chem.," 16, 137 (1977)], $Rh_2Cl_2(CO)_2(Ph_2PCH_2PPh_2)_2$ [Yasukazu Saito: "Catalyst," 22, 253 (1980)], a $RhCl_3$-$SnCl_2$ type complex [H. Moriyama et al: J. Chem. Soc., Perkin II, 369 (1982)], an $IrCl_3SnCl_2$ type complex and $RuCl_2$-$SnCl_2$ type complex [T. Yamakawa et al: 5th Int. Conf. Photochem. Conversion and Storage of Solar Energy, Osaka (1984), p. 306]. This reaction, however, is disadvantageous from the economic point of view and in terms of the utilization factor of the solar energy because it is required to use in the catalyst therefor such expensive substances as Raney nickel, rhodium, and iridium, able to utilize only the short-wavelength portion of the solar light, for example, and able to proceed only to the stage of acetone and, therefore, store the energy only in an insufficient amount and induce the gasification of the aqueous solution to an insufficient extent.

OBJECT AND SUMMARY OF THE INVENTION

This invention aims at eliminating the various drawbacks of the prior art mentioned above, particularly at enabling an aqueous acetone solution to be economically and efficiently converted into a gaseous fuel of high energy by the use of an inexpensive catalyst.

The inventors conducted studies with a view to accomplishing the object mentioned above. As a result, they found that a high-calorie mixed gas composed mainly of methane and hydrogen is generated when an aqueous acetone solution and powdered silicon are brought into mutual contact and the product of this contact is exposed to light. To be specific, this invention is directed to a method for the gasification of an aqueous acetone solution, characterized by causing the aqueous acetone solution to contact powdered silicon and then exposing the resultant product of contact to light thereby causing the resultant product of contact to generate a fuel gas.

DETAILED DESCRIPTION OF THE PREFERRED EMBODIMENTS

The powdered silicon to be used in the present invention may be a commercially available reagent quality silicon in a powdered state. Preferably, it is a product which has been thermally reduced either under a vacuum or in a current of hydrogen. The thermal reduction is desirable because silicon generally is susceptible of oxidation and consequent partial conversion into silicon oxide and, therefore, must be reverted to elementary silicon.

For practical purposes, the powdered silicon is desired to possess purity of at least 95% and an average particle diameter in the range of 0.1 to 500 μm.

Though the concentration of silicon powder in the aqueous solution thereof and the ratio of acetone to silicon powder have no significant bearing upon the generation of the fuel gas, it is desirable for practical purposes that the acetone content in the aqueous solution be in the range of 5 to 95% by weight and the amount of powdered silicon be in the range of 0.01 to 1 g per 100 ml of the aqueous solution.

Further, the powdered silicon is enabled to have the activity thereof enhanced by causing an electroconductive film of such a metal as platinum, ruthenium, rhodium, or titanium or such a polymer as polyacetylene, polypyrrole, or polythiophene to be deposited fast on part, specifically 1 to 50%, of the surface area of the powdered silicon.

The aqueous acetone solution, when necessary, may incorporate therein an electrolyte such as, for example, an acid, an alkali, or an inorganic salt in a concentration approximately in the range of 1 to 10% by weight.

The fuel gas to be generated in this invention is composed mainly of methane and hydrogen and may additionally contain oxygen, carbon monoxide, and carbon dioxide in small amounts.

The container in which the reaction of this invention is carried out may be made of glass, quartz, or plastic provided that the material selected does not react with acetone or water or the aqueous acetone solution, possesses transparency for thorough passage of light, and is able to withstand the heat to be applied thereto. Where the reaction is to be induced by causing a light source inserted in the solution to radiate outwardly through the surrounding solution, the container may be made of a metallic or other non-transparent material. The powdered silicon may be dispersed in the aqueous acetone solution as stirred with a stirring rod or a stirring piece and, in the dispersed state, exposed to light. Otherwise, the powdered silicon may be spread on the bottom surface of the container and exposed to light which is projected upwardly from a light source disposed below the container. The powdered silicon may be used as coated or vacuum deposited on the inner surface of the container exposed to the light. Alternatively, the acetone solution having the powdered silicon dispersed therein may be exposed to the light as heated and circulated. While the reaction is in process, the reaction solution is desired to have air or oxygen dissolved therein. This is because the dissolved oxygen is enabled to accelerate the oxidizing reaction. On exposure to the light, the reaction solution rises in temperature. The elevation of the temperature increases the reaction velocity and the rate of the generation of gas. Where the temperature of the reaction solution is unduly low, the solution may be heated. The light sources which are usable effectively in this invention include mercury lamp, xenon lamp, halogen lamp, and incandescent lamp, for example. Since silicon has a small band gap, even the light of long wavelength can be utilized effectively for the purpose of the exposure.

Now, the present invention will be described more specifically below with reference to working examples.

EXAMPLE 1

In a flask of Pyrex Glass having an inner volume of 100 ml, 50 ml of acetone and 50 ml water were placed and 0.1 g of powdered silicon possessed of an average particle diameter of 100 μm and heated in a vacuum at 900° C. for 5 hours was added thereto. Then, the contents of the flask were kept stirred with a magnetic stirrer and, at the same time, exposed to the light of a xenon lamp of 300 W having a wavelength distribution close to that of the sunlight. The gas generated by the exposure of the light was analyzed by gas chromatography. The reaction was found to generate a mixed gas composed of methane and hydrogen at a rate of about 5 ml per hour.

EXAMPLE 2

In a flask of quartz glass having an inner volume of 150 ml, 50 ml of acetone and 100 ml of water were placed and 0.1 g of the same powdered silicon as in Example 1 was added thereto. Then, the contents of the flask were kept stirred with a magnetic stirrer and, at the same time, exposed to the light of a mercury lamp of 100 W. The gas generated by the exposure of the light was analyzed by gas chromatography. The reaction was found to generate the same mixed gas at a rate of about 3 ml per hour.

EXAMPLE 3

In a flask of Pyrex Glass having an inner volume of 150 ml, 100 ml of acetone and 50 ml of water were placed and 0.1 g of commercially available powdered silicon ground thoroughly in a mortar and possessed of an average particle diameter of 250 μm was added thereto. Then, the contents of the flask were kept stirred with a magnetic stirrer and, at the same time, exposed to the light of a xenon lamp of 300 W. The gas generated by the exposure of the light was analyzed by gas chromatography. The reaction generated the same mixed gas as in Example 1 at a ratio of about 2 ml per hour.

EXAMPLE 4

In a flask of Pyrex Glass having an inner volume of 100 ml, 50 ml of acetone and 50 ml of water were placed and 2.77 g (0.01 mol) of nickel chloride hexahydrate was added thereto and dissolved therein and 0.1 g of powdered silicon heated in a vacuum at 900° C. for 5 hours and possessed of an average particle diameter of 10 μm was added thereto. Then, the contents of the flask were kept stirred with a magnetic stirrer and, at the same time, exposed to the light of a xenon lamp of 300 W. The gas generated by the exposure of the light was analyzed by gas chromatograhy. The reaction was found to generate a mixed gas comprising methane and hydrogen and further containing oxygen, carbon monoxide, and carbon dioxide in small amounts at a rate of about 4 ml per hour.

EXAMPLE 5

In a flask of quartz glass having an inner volume of 150 ml, 50 ml of acetone and 100 ml of water placed, 5.54 g (0.02 mol) of nickel chloride hexahydrate was added thereto and dissolved therein, and 0.1 g of the same powdered silicon as in Example 1 was added thereto. Then, the contents of the flask were kept stirred with a magnetic stirrer and, at the same time, exposed to the light of a mercury lamp of 100 W. The gas generated by the ensuing reaction was analyzed by gas chromatography. The reaction was found to generate the same mixed gas in Example 4 at a rate of about 2 ml per hour.

COMPARATIVE EXPERIMENT 1

In a flask of Pyrex Glass, 100 ml of water was placed and 0.1 g of the same powdered silicon as in Example 1 was added. Then, the contents of the flask were kept stirred with a magnetic stirrer and, at the same time, exposed to the light of a xenon lamp of 300 W. The reaction system was found to generate virtually no gas.

COMPARATIVE EXPERIMENT 2

In a flask of Pyrex Glass, 100 ml of acetone was placed and 0.1 g of the same powdered silicon as in Example 1 was added thereto. Then, the contents of the flask were kept stirred with a magnetic stirrer and, at the same time, exposed to the light of a xenon lamp of 300 W. The reaction system was found to generate virtually no gas.

As described above, the present invention is aimed at easily converting a light energy into a chemical energy and consequently obtaining a fuel gas of high calorie by a simple method of adding powdered silicon to an aqueous acetone solution and exposing the resultant aqueous dispersion to the light. The silicon to be used as the catalyst in the present invention occurs abundantly on the earth. It is inexpensive, not poisonous, and safe. Moreover, since it has a small band gap, even the light of long wavelength can be efficiently utilized. Further, since this reaction gains in velocity and in speed of generation of the fuel gas on being heated, the light and the heat of the solar energy can be fully utilized. This invention, therefore, has great economic utility.

What is claimed is:

1. A method for the gasification of an aqueous acetone solution, characterized by causing said aqueous acetone solution to contact powdered silicon and exposing the resultant product of said contact to light thereby generating a fuel gas.

2. A method according to claim 1, wherein the concentration of acetone in said aqueous acetone solution is in the range of 5 to 95% by weight.

3. A method according to claim 1, wherein the source for said light exposure is one member selected from the group consisting of the sun, mercury lamp, xenon lamp, halogen lamp, and incandescent lamp.

4. A method according to claim 1, wherein the average particle diameter of said powdered silicon is in the range of 0.01 to 500 μm.

5. A method according to claim 1, wherein said fuel gas to be generated is composed mainly of methane and hydrogen.

6. A method according to claim 1, wherein said powdered silicon has deposited fast on the surface thereof at least one member selected from the group consisting of electroconductive metal films and electroconductive polymer films.

* * * * *

UNITED STATES PATENT AND TRADEMARK OFFICE
CERTIFICATE OF CORRECTION

PATENT NO.   : 4,869,795
DATED        : Sep. 26, 1989
INVENTOR(S)  : Hiroshi Taoda, et al It is certified that error appears in the above-identified patent and that said Letters Patent is hereby corrected as shown below:

On the title page:

The Assignee is incorrectly recorded,
"Agency of Industrial Science, Tokyo, Japan;
Ministry of International Trade and Industry, Tokyo, Japan"

should be:
--Agency of Industrial Science & Technology, Ministry of International Trade & Industry, Tokyo, Japan--

Signed and Sealed this

Ninth Day of October, 1990

Attest:

HARRY F. MANBECK, JR.

Attesting Officer

Commissioner of Patents and Trademarks